US012323187B2

(12) United States Patent
Liao et al.

(10) Patent No.: US 12,323,187 B2
(45) Date of Patent: Jun. 3, 2025

(54) METHOD FOR DETERMINING POWER COMPENSATION VALUE OF OPTICAL SIGNAL AND RELATED APPARATUS

(71) Applicant: Huawei Technologies Co., Ltd., Shenzhen (CN)

(72) Inventors: Shenghui Liao, Dongguan (CN); Man Li, Wuhan (CN); Yuanwu Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 237 days.

(21) Appl. No.: 18/309,178

(22) Filed: Apr. 28, 2023

(65) Prior Publication Data
US 2023/0261751 A1 Aug. 17, 2023

Related U.S. Application Data

(63) Continuation of application No. PCT/CN2021/121661, filed on Sep. 29, 2021.

(30) Foreign Application Priority Data
Oct. 30, 2020 (CN) .......................... 202011200618.4

(51) Int. Cl.
*H04B 10/293* (2013.01)
*H04B 10/564* (2013.01)

(52) U.S. Cl.
CPC ......... *H04B 10/293* (2013.01); *H04B 10/564* (2013.01)

(58) Field of Classification Search
None
See application file for complete search history.

(56) References Cited

U.S. PATENT DOCUMENTS 7,224,514 B2 *   5/2007   Peeters .............. H04B 10/2537
                                                   359/337
2002/0181061 A1 * 12/2002   Uda ...................... H04B 10/294
                                                   398/79
(Continued)

FOREIGN PATENT DOCUMENTS

JP       H11218790 A     8/1999
JP       2014229913 A    12/2014
(Continued)

OTHER PUBLICATIONS

Kawahara, H. et al., Cancellation of Static and Dynamic Power Transitions induced by inter-band Stimulated Raman Scattering in C+L-band WDM Transmission, 2020 Opto-Electronics and Communications Conference (OECC), Oct. 8, 2020, total 3 pages.

*Primary Examiner* — David W Lambert
(74) *Attorney, Agent, or Firm* — SLATER MATSIL, LLP

(57) ABSTRACT

A power calculation method including obtaining a first optical signal and a second optical signal; detecting first optical power of each waveband in the first optical signal and second optical power of each waveband in the second optical signal; calculating, based on the first optical power, a first optical power variation that is of each waveband of the first optical signal and that is used after the first optical signal is transmitted from a transmitting end to a receiving end, and calculating, based on the second optical power, a second optical power variation that is of each waveband of the second optical signal and that is used after the second optical signal is transmitted from the transmitting end to the receiving end; and determining a first compensation value and a second compensation value based on the first optical power variation and the second optical power variation.

20 Claims, 4 Drawing Sheets

(56) References Cited

U.S. PATENT DOCUMENTS

2005/0111847 A1* 5/2005 Jasti .................. H04J 14/02216
398/147
2019/0312641 A1* 10/2019 Ishii ................. H04B 10/07957

FOREIGN PATENT DOCUMENTS

| JP | 2019186735 A | 10/2019 |
| WO | 2020194860 A1 | 10/2020 |

* cited by examiner

METHOD FOR DETERMINING POWER COMPENSATION VALUE OF OPTICAL SIGNAL AND RELATED APPARATUS

CROSS-REFERENCE TO RELATED APPLICATIONS

This application is a continuation of International Application No. PCT/CN2021/121661, filed on Sep. 29, 2021, which claims priority to Chinese Patent Application No. 202011200618.4, filed on Oct. 30, 2020. The disclosures of the aforementioned applications are hereby incorporated by reference in their entireties.

TECHNICAL FIELD

This application relates to the field of optical communication, and in particular, to a method for determining a power compensation value of an optical signal and a related apparatus.

BACKGROUND

With rapid growth of data traffic in a network, a higher requirement is posed on a network transmission capacity. Generally, a channel operating spectrum width (a quantity of channels) may be increased to increase the network transmission capacity, for example, an original C band is extended to the C band and an L band.

However, as the channel spectrum width increases, there is a stimulated Raman scattering (SRS) effect on a multi-wavelength transmission system link, and transmit power of a short band is transferred to transmit power of a long band. In a stable state without wavelength adding or dropping, a power transfer between multi-wavelength signals that is caused by the SRS effect is stable. When wavelength adding or dropping occurs, a quantity, distribution, positions, and the like of the multi-wavelength signals change randomly. Consequently, a complex change occurs on the power transfer between the multi-wavelength signals, and may exceed a system tolerance capability, and signal transmission stability is reduced.

SUMMARY

Embodiments of this application provide a method for determining a power compensation value of an optical signal and a related apparatus, so that a power change caused by an SRS effect in a process of transmitting an optical signal in an optical fiber does not exceed a system tolerance capability. In addition, power spectral slops used before and after wavelength adding or dropping is performed on the optical signal match, thereby improving signal transmission stability.

According to a first aspect, an embodiment of this application provides a method for determining a power compensation value of an optical signal. The method includes the following steps.

First, a first optical signal and a second optical signal are obtained, where the first optical signal is an optical signal obtained by performing wavelength adding or dropping on the second optical signal. The second optical signal includes at least one wavelength signal, and the at least one wavelength signal of the second optical signal is distributed in at least one waveband. The first optical signal includes at least one wavelength signal, and the at least one wavelength signal of the first optical signal is distributed in at least one waveband. A wavelength signal of the first optical signal is distributed in any waveband corresponding to the first optical signal, and a wavelength signal of the second optical signal is distributed in any waveband corresponding to the second optical signal. Next, first optical power of each waveband in the first optical signal and second optical power of each waveband in the second optical signal are detected. Then, a first optical power variation that is of each waveband of the first optical signal and that is used after the first optical signal is transmitted from a transmitting end to a receiving end is calculated based on the first optical power, and a second optical power variation that is of each waveband of the second optical signal and that is used after the second optical signal is transmitted from the transmitting end to the receiving end is calculated based on the second optical power. Further, a first compensation value and a second compensation value are determined based on the first optical power variation and the second optical power variation, where the first compensation value is used to compensate for total power of the first optical signal, and the second compensation value is used to compensate for a power spectral slope of the first optical signal.

In this implementation, before the first optical signal is transmitted, the total power of the first optical signal may be compensated for based on the first compensation value, so that a power change caused by an SRS effect in a process of transmitting the first optical signal in an optical fiber does not exceed a system tolerance capability, thereby improving signal transmission stability. In addition, the power spectral slope of the first optical signal may further be compensated for based on the second compensation value, so that power spectrum slopes of the first optical signal and the second optical signal that are received by the signal receiving end match, thereby further improving the signal transmission stability.

In some possible implementations, the method further includes: obtaining a first coefficient and a second coefficient, where the first coefficient is associated with a transmission type of a signal, and the second coefficient is associated with an optical power transfer between every two wavebands. The determining, based on the first optical power, a first optical power variation that is of each waveband of the first optical signal and that is used after the first optical signal is transmitted from a transmitting end to a receiving end includes: calculating the first optical power variation based on the first optical power, the first coefficient, and the second coefficient. The determining, based on the second optical power, a second optical power variation that is of each waveband of the second optical signal and that is used after the second optical signal is transmitted from the transmitting end to the receiving end includes: calculating the second optical power variation based on the second optical power, the first coefficient, and the second coefficient. In this implementation, a specific implementation of calculating the first optical power variation and the second optical power variation is provided, thereby improving implementability of this solution.

In some possible implementations, the method further includes: obtaining a ratio of optical power of each waveband in the first optical signal to the total power of the first optical signal. The determining a first compensation value based on the first optical power variation and the second optical power variation includes: substituting the first optical power variation, the second optical power variation, and the ratio into a first formula to calculate the first compensation value. The first formula includes: $C1 = \sum_{i=1}^{M}((Si1 - Si2) * Xi)$, where C1 represents the first compensation value, i represents a sequence number of a waveband, M represents a quantity of wavebands, Si1 represents a second optical power variation of waveband i in the second optical signal, Si2 represents a first optical power variation of waveband i in the first optical signal, and Xi represents the ratio. In this implementation, a specific implementation of calculating the first compensation value is provided, so that a power compensation value of the first optical signal may be more accurately calculated.

In some possible implementations, the determining a second compensation value based on the first optical power variation and the second optical power variation includes: substituting a first optical power variation of a first-segment waveband in the first optical signal, a first optical power variation of a last-segment waveband in the first optical signal, a second optical power variation of a first-segment waveband in the second optical signal, and a second optical power variation of a last-segment waveband in the second optical signal into a second formula to calculate the second compensation value. The second formula includes: C2=(S1 max−S1 min)−(S2 max−S2 min), where C2 represents the second compensation value, S1 max represents the first optical power variation of the last-segment waveband in the first optical signal, S1 min represents the first optical power variation of the first-segment waveband in the first optical signal, S2 max represents the second optical power variation of the last-segment waveband in the second optical signal, and S2 min represents the second optical power variation of the first-segment waveband in the second optical signal. In this implementation, a specific implementation of calculating the second compensation value is provided, so that this solution is more practical.

In some possible implementations, the method further includes: compensating for the total power of the first optical signal based on the first compensation value, and compensating for the power spectral slope of the first optical signal based on the second compensation value.

In some possible implementations, the compensating for the total power of the first optical signal based on the first compensation value includes: adjusting a pump current in an optical amplifier based on the first compensation value, to adjust output power of the first optical signal after the first optical signal passes through the optical amplifier. In this implementation, a specific implementation of performing power compensation based on an optical amplifier is provided, and the power compensation may be accurately completed based on the first compensation value.

In some possible implementations, the compensating for the power spectral slope of the first optical signal based on the second compensation value includes: adjusting, based on the second compensation value, attenuation of a variable optical attenuator VOA that is in the optical amplifier, to adjust a power spectral slope that is of the first optical signal and that is used after the first optical signal passes through the optical amplifier. In this implementation, a specific implementation of performing power spectral slope compensation based on the VOA is provided, and the power spectral slope compensation may be accurately completed based on the second compensation value.

In some possible implementations, the detecting first optical power of each waveband in the first optical signal includes: dividing the first optical signal into optical signals of a plurality of wavebands through filters; and detecting the first optical power of each waveband in the first optical signal through a power detector. The detecting the second optical power of each waveband in the second optical signal includes: dividing the second optical signal into optical signals of a plurality of wavebands through filters; and detecting the second optical power of each waveband in the second optical signal through a power detector. In this implementation, the filter and the power detector may be used together to detect the power of each waveband, thereby improving practicability of this solution.

In some possible implementations, the detecting first optical power of each waveband in the first optical signal includes: detecting the first optical power of each wavelength in the first optical signal through an optical spectrum analyzer (OSA) or an optical performance monitor (OPM). The detecting the second optical power of each waveband in the second optical signal includes: detecting the second optical power of each wavelength in the second optical signal through the OSA or the OPM. In this implementation, the OSA and the OPM have a capability of detecting signals in a specific wavelength range. Therefore, no filter needs to be configured, and output amounts of the OSA and the OPM are still power of each waveband, thereby improving scalability of this solution.

According to a second aspect, embodiments of this application provide a power calculation apparatus, including a processor, a memory, and an optical detection module. The processor, the memory, and the optical detection module are connected to each other through a line. The optical detection module is configured to: obtain a first optical signal and a second optical signal, where the first optical signal is an optical signal obtained by performing wavelength adding or dropping on the second optical signal, the second optical signal includes at least one wavelength signal, the at least one wavelength signal of the second optical signal is distributed in at least one waveband, the first optical signal includes at least one wavelength signal, and the at least one wavelength signal of the first optical signal is distributed in at least one waveband, where a wavelength signal of the first optical signal is distributed in any waveband corresponding to the first optical signal, and a wavelength signal of the second optical signal is distributed in any waveband corresponding to the second optical signal; and detect first optical power of each waveband in the first optical signal and second optical power of each waveband in the second optical signal; and the processor is configured to: determine, based on the first optical power, a first optical power variation that is of each waveband of the first optical signal and that is used after the first optical signal is transmitted from a transmitting end to a receiving end, and determine, based on the second optical power, a second optical power variation that is of each waveband of the second optical signal and that is used after the second optical signal is transmitted from the transmitting end to the receiving end; determine a first compensation value based on the first optical power variation and the second optical power variation, where the first compensation value is used to compensate for total power of the first optical signal; and determine a second compensation value based on the first optical power variation and the second optical power variation, where the second compensation value is used to compensate for a power spectral slope of the first optical signal.

In some possible implementations, the processor is further configured to: obtain a first coefficient and a second coefficient, where the first coefficient is associated with a transmission type of a signal, and the second coefficient is associated with an optical power transfer between every two wavebands; and the processor is specifically configured to: calculate the first optical power variation based on the first optical power, the first coefficient, and the second coefficient; and calculate the second optical power variation based on the second optical power, the first coefficient, and the second coefficient.

In some possible implementations, the processor is further configured to: obtain a ratio of optical power of each waveband in the first optical signal to the total power of the first optical signal; and the processor is specifically configured to: substitute the first optical power variation, the second optical power variation, and the ratio into a first formula to calculate the first compensation value, where the first formula includes: $C1=\Sigma_{i=1}^{M}((Si1-Si2)*Xi)$, where C1 represents the first compensation value, i represents a sequence number of a waveband, M represents a quantity of wavebands, Si1 represents a second optical power variation of waveband i in the second optical signal, Si2 represents a first optical power variation of waveband i in the first optical signal, and Xi represents the ratio.

In some possible implementations, the processor is specifically configured to: substitute a first optical power variation of a first-segment waveband in the first optical signal, a first optical power variation of a last-segment waveband in the first optical signal, a second optical power variation of a first-segment waveband in the second optical signal, and a second optical power variation of a last-segment waveband in the second optical signal into a second formula to calculate the second compensation value; and the second formula includes: C2=(S1max−S1 min)−(S2 max−S2 min), where C2 represents the second compensation value, S1 max represents the first optical power variation of the last-segment waveband in the first optical signal, S1 min represents the first optical power variation of the first-segment waveband in the first optical signal, S2 max represents the second optical power variation of the last-segment waveband in the second optical signal, and S2 min represents the second optical power variation of the first-segment waveband in the second optical signal.

In some possible implementations, the processor is further configured to: compensate for the total power of the first optical signal based on the first compensation value; and compensate for the power spectral slope of the first optical signal based on the second compensation value.

In some possible implementations, the processor is specifically configured to: adjust a pump current in an optical amplifier based on the first compensation value, to adjust output power of the first optical signal after the first optical signal passes through the optical amplifier.

In some possible implementations, the processor is specifically configured to: adjust, based on the second compensation value, attenuation of a variable optical attenuator VOA that is in the optical amplifier, to adjust a power spectral slope that is of the first optical signal and that is used after the first optical signal passes through the optical amplifier.

In some possible implementations, the optical detection module includes filters and power detectors. The filters are configured to: divide the first optical signal into optical signals of a plurality of wavebands; and divide the second optical signal into optical signals of a plurality of wavebands. The power detector is configured to: detect the first optical power of each waveband in the first optical signal; and detect the second optical power of each waveband in the second optical signal.

In some possible implementations, the optical detection module includes an OSA or an OPM. The OSA or the OPM is configured to: detect the first optical power of each wavelength in the first optical signal; and detect the second optical power of each wavelength in the second optical signal.

According to a third aspect, embodiments of this application provide an optical transmission system, including a first site and a second site. The first site is configured to perform the method for determining a power compensation value of an optical signal according to any implementation of the first aspect. The second site is configured to receive an optical signal output by the first site.

In some possible implementations, the first site includes an optical amplifier site or a reconfigurable optical add/drop multiplexer (ROADM) site.

According to the foregoing technical solutions, it can be learned that embodiments of this application have the following advantages.

In embodiments of this application, the first optical signal is an optical signal obtained by performing wavelength adding or dropping on the second optical signal, and the signal transmitting end needs to detect the first optical power of each waveband in the first optical signal and the second optical power of each waveband in the second optical signal. Next, the first optical power variation caused by the SRS effect in each waveband after the first optical signal is transmitted from the transmitting end to the receiving end may be calculated based on the first optical power, and the second optical power variation caused by the SRS effect in each waveband after the second optical signal is transmitted from the transmitting end to the receiving end may be calculated based on the second optical power. Then, the first compensation value and the second compensation value may be determined based on the first optical power variation and the second optical power variation. Further, before the first optical signal is transmitted, the total power of the first optical signal may be compensated for based on the first compensation value, so that the power change caused by the SRS effect in the process of transmitting the first optical signal in the optical fiber does not exceed the system tolerance capability, thereby improving the signal transmission stability. In addition, the power spectral slope of the first optical signal may further be compensated for based on the second compensation value, so that power spectrum slopes of the first optical signal and the second optical signal that are received by the signal receiving end match, thereby further improving the signal transmission stability.

DETAILED DESCRIPTION OF ILLUSTRATIVE EMBODIMENTS

Embodiments of this application provide a method for determining a power compensation value of an optical signal and a related apparatus, so that a power change caused by an SRS effect in a process of transmitting an optical signal in an optical fiber does not exceed a system tolerance capability. In addition, power spectral slops used before and after wavelength adding or dropping is performed on the optical signal match, thereby improving signal transmission stability.

It should be noted that the terms "first", "second", "third", "fourth", and the like in the specification, claims, and accompanying drawings of this application are used to distinguish between similar objects, but do not limit a specific order or sequence. It should be understood that the foregoing terms are interchangeable in proper circumstances, so that embodiments described in this application can be implemented in other orders rather than the content described in this application. Moreover, the terms "include", "have", or any other variant thereof are intended to cover non-exclusive inclusion. For example, processes, methods, systems, products, or devices that include a series of steps or units are not limited to the steps or the units that are clearly listed, and may include other steps and units that are not clearly listed or that are essential for the processes, methods, products, or devices.

Figure 1:
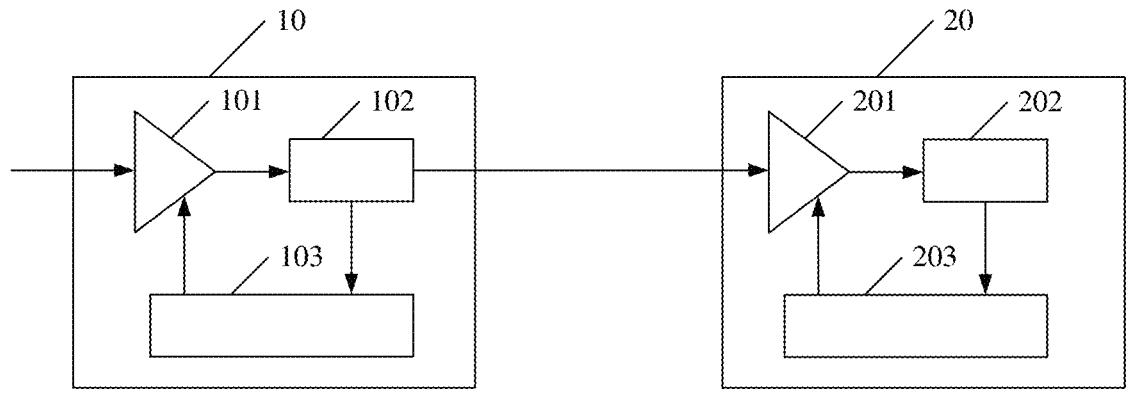
FIG. 1 is a schematic diagram of a structure of an optical transmission system used in this application.

FIG. 1 is a schematic diagram of a structure of an optical transmission system used in this application. The optical transmission system includes at least a first site 10 and a second site 20. The first site 10 includes an optical amplifier 101, a coupler 102, and a power detection apparatus 103. The second site 20 includes an optical amplifier 201, a coupler 202, and a power detection apparatus 203. As shown in FIG. 1, the first site 10 may transmit a multi-wavelength signal to the second site 20 through an optical fiber. The transmission of the multi-wavelength signal in the optical fiber is affected by a stimulated Raman scattering (SRS) effect, and consequently transmit power of a short band is transferred to transmit power of a long band.

It should be understood that, if wavelength adding (Add) or dropping (Drop) is not performed on the current multi-wavelength signal, a power transfer between multi-wavelength signals that is caused by the SRS effect is stable. When wavelength adding or dropping occurs, a quantity, distribution, positions, and the like of multi-wavelength signals change randomly. Consequently, a complex change occurs on the power transfer between the multi-wavelength signals, and such a power change may exceed a system tolerance capability. Therefore, in this application, the power detection apparatus 103 is disposed in the first site 10. Before the multi-wavelength signal output by the first site 10 enters the optical fiber, the power detection apparatus 103 may calculate a power change caused by the SRS effect in advance. Further, the first site 10 may compensate for transmission power of the multi-wavelength signals based on a calculation result. This avoids a complex change in a power transfer between multi-wavelength signals in a transmission process, thereby improving signal transmission stability.

Specifically, the coupler 102 may divide signals output by the optical amplifier 101 into different channels. Signals in one channel are coupled into the optical fiber for transmission to the second site 20. Signals in another channel are coupled into the power detection apparatus 103 for calculating the power change caused by the SRS effect. The power detection apparatus 103 calculates a power value that needs to be compensated for, outputs the compensation value to the optical amplifier 101, and then the optical amplifier 101 performs power compensation on a subsequent output signal. It should be understood that the coupler 102 divides signals based on a power ratio, and wavelengths included in signals of each channel are the same. For example, the coupler 102 may divide signals based on a power ratio of 99:1, most of the signals are coupled into the optical fiber, and only a small quantity of the signals need to be reserved for detection and calculation.

It should be noted that a type of the foregoing optical amplifier may be an erbium doped fiber application amplifier (EDFA), a semiconductor optical amplifier (SOA), or the like, and may be an integrated amplifier or a discrete amplifier. This is not specifically limited herein. The first site 10 and the second site 20 each may be another type of site other than the optical amplifier site shown in FIG. 1, for example, may be a reconfigurable optical add/drop multiplexer (ROADM) site. This is not specifically limited herein.

The following describes the method for determining a power compensation value of an optical signal provided in this application.

Figure 2:
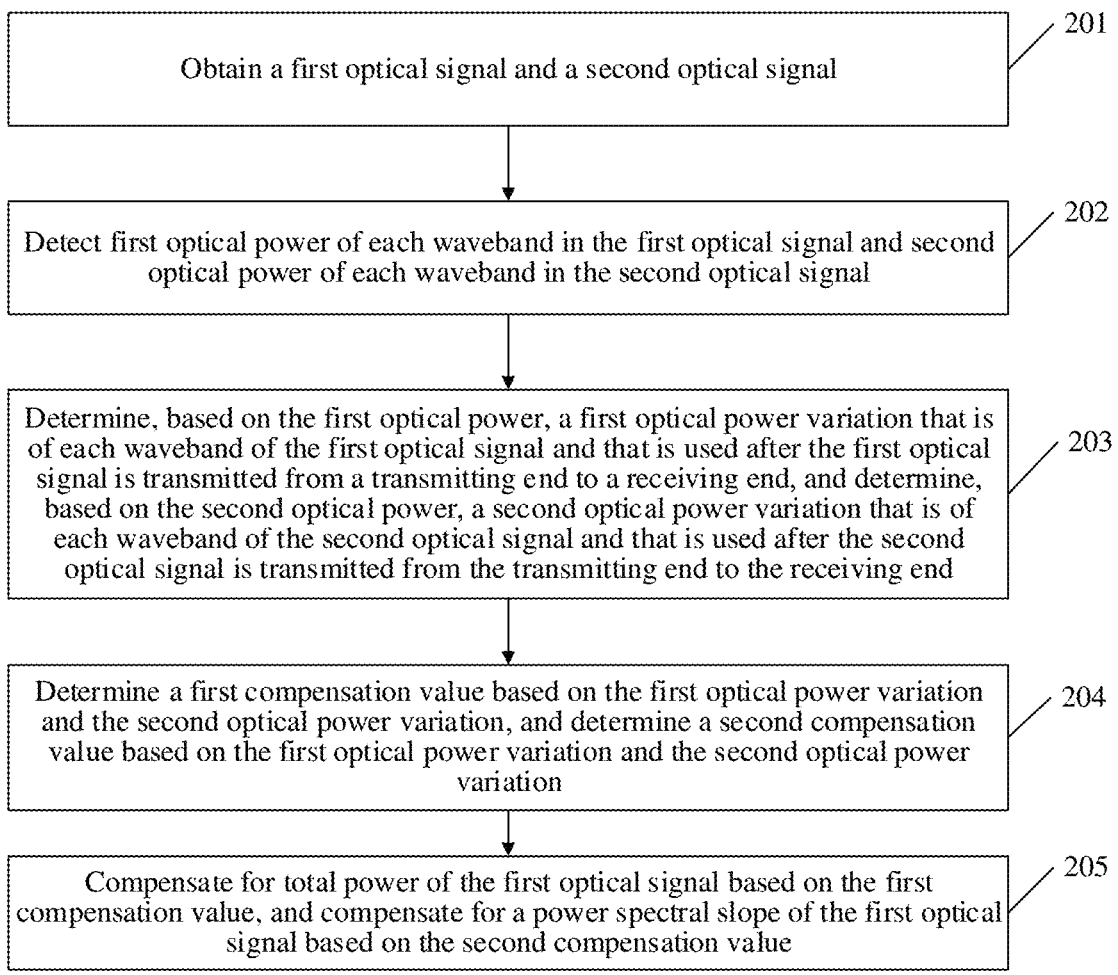
FIG. 2 is a schematic diagram of an embodiment of a method for determining a power compensation value of an optical signal according to this application.

FIG. 2 is a schematic diagram of an embodiment of a method for determining a power compensation value of an optical signal according to this application. In this example, the method for determining a power compensation value of an optical signal includes the following steps.

201: Obtain a first optical signal and a second optical signal.

In this embodiment, the first optical signal is an optical signal obtained by performing wavelength adding or dropping on the second optical signal. The second optical signal may be a single-wavelength signal, or may be a multi-wavelength signal. The second optical signal is distributed in at least one waveband, and different wavebands correspond to different wavelength signals. In addition, each wavelength signal has a corresponding wavelength value, and each waveband includes a wavelength value of at least one wavelength signal. By performing wavelength adding or dropping on the second optical signal, the first optical signal may be a single-wavelength signal, or may be a multi-wavelength signal. It should be understood that, if the second optical signal is a single-wavelength signal, the first optical signal is a multi-wavelength signal obtained by performing wavelength adding on the second optical signal. If the first optical signal is a single-wavelength signal, the second optical signal is a multi-wavelength signal, and the first optical signal is obtained by performing wavelength dropping on the second optical signal. That is, the first optical signal and the second optical signal have an identical waveband, and also have a different waveband. For ease of description, in this application, wavelength signals (Ch1, Ch2, and the like) are distinguished by using channel numbers of the wavelength signals. A wavelength value of each wavelength signal may be determined based on a channel number of the wavelength signal. These wavelength signals may belong to either a C band or an L band. This is not specifically limited herein. It should be noted that the first optical signal may be a full-wavelength signal (obtained by performing wavelength adding on the second optical signal), or may not be a full-wavelength signal. The second optical signal may be a full-wavelength signal (where the first optical signal is obtained by performing wavelength dropping on the second optical signal), or may not be a full-wavelength signal.

Figure 3:
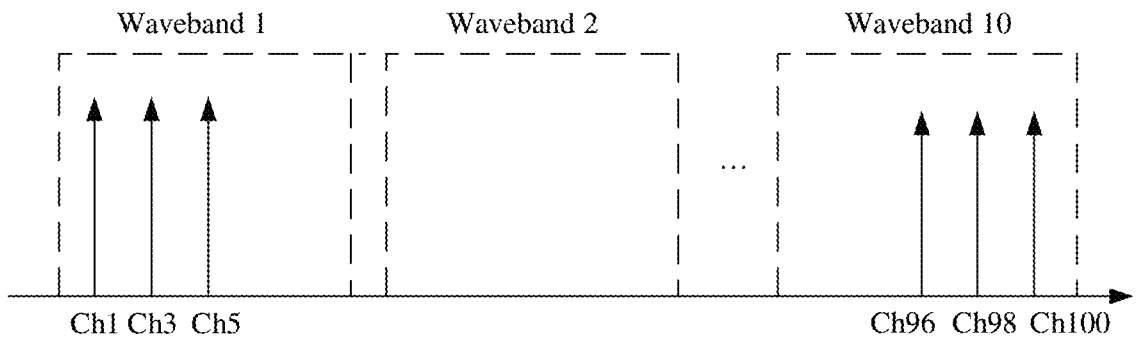
FIG. 3 is a schematic diagram of an embodiment in which a multi-wavelength signal is distributed in a plurality of wavebands.

FIG. 3 is a schematic diagram of an embodiment in which a multi-wavelength signal is distributed in a plurality of wavebands. For example, in this application, the second optical signal is a full-wavelength signal, and includes 100 wavelength signals from Ch1 to Ch100, and the 100 wavelength signals are distributed in 10 different wavebands. Every 10 consecutive wavelength signals are distributed in an identical waveband. For example, wavelength signals Ch1 to Ch10 are distributed in waveband 1, wavelength signals Ch11 to Ch20 are distributed in waveband 2, . . . , and wavelength signals Ch91 to Ch100 are distributed in waveband 10. In this application, the first optical signal includes six wavelength signals: Ch1, Ch3, Ch5, Ch96, Ch98, and Ch100. The wavelength signals Ch1, Ch3, and Ch5 are distributed in waveband 1, and the wavelength signals Ch96, Ch98, and Ch100 are distributed in waveband 10.

It should be noted that, a quantity of wavebands is not limited in this application, and may be 10 described above, 20, 30, or the like. In actual application, wavebands may be divided in a plurality of manners, and the manners may include an equal division manner shown in FIG. 3, and a non-equal division manner in which different wavebands correspond to different quantities of wavelength signals. In addition, the wavebands may also have different division granularities. For example, each waveband may correspond to a plurality of wavelength signals, as shown in FIG. 3. Alternatively, each waveband may uniquely correspond to one wavelength signal. This is not specifically limited herein. A total quantity of available wavelengths is also not limited in this application, and may be 100 available wavelengths shown in FIG. 3, or may be 120 available wavelengths, 200 available wavelengths, or the like.

202: Detect first optical power of each waveband in the first optical signal and second optical power of each waveband in the second optical signal.

In this embodiment, optical power detection may be specifically implemented in a plurality of manners. Descriptions are separately provided below.

Type 1: An implementation of using filters and power detectors (PDs) together

Figure 4:
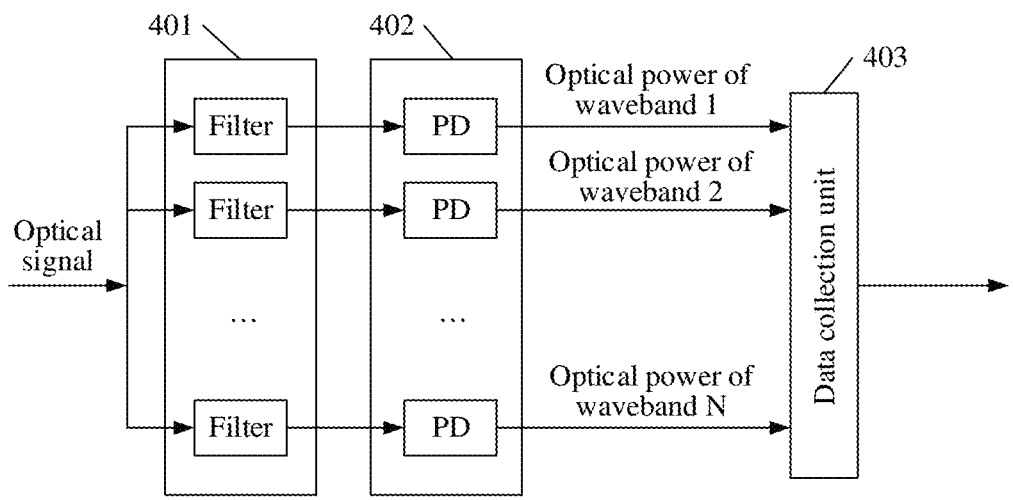
FIG. 4 is a schematic diagram of an embodiment of optical power detection according to this application.

FIG. 4 is a schematic diagram of an embodiment of optical power detection according to this application. As shown in FIG. 4, a plurality of filters 401 and a plurality of PDs (402) are included, and are in one-to-one correspondence. An optical signal of each waveband has a corresponding group of a filter and a PD. Each filter may filter out an optical signal that is in a waveband corresponding to the filter, and then each PD detects optical power of a corresponding waveband. FIG. 3 is used as an example. If the second optical signal is distributed in waveband 1 to waveband 10, at least 10 groups of a filter and a PD need to be disposed. When the second optical power of each waveband in the second optical signal is detected, all the 10 PDs need to work. When the first optical power of each waveband in the first optical signal is detected, only optical power of waveband 1 and optical power of waveband 10 need to be detected through a first PD and a tenth PD respectively.

It should be noted that the filter may be specifically in a discrete design shown in FIG. 4, or may be in a design in another form, for example, an integrated design or a form of a cascaded filter. This is not specifically limited herein.

In some possible implementations, the optical power detected by the PD may alternatively be collected by setting a data collection unit 403. The data collection unit may be specifically implemented by a component with a data collection function, such as an analog-to-digital converter (ADC).

Figure 5:
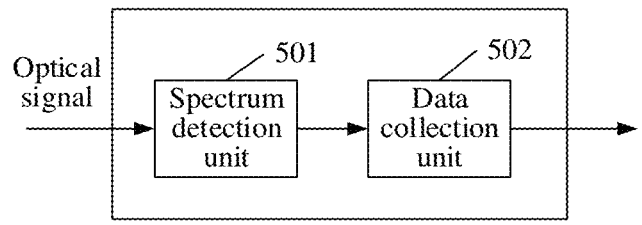
FIG. 5 is a schematic diagram of another embodiment of optical power detection according to this application.

Type 2: An implementation of performing power detection by using a spectrum detection unit FIG. 5 is a schematic diagram of another embodiment of optical power detection according to this application. As shown in FIG. 5, a spectrum detection unit 501 may detect spectral information of an optical signal, for example, may detect optical power of each wavelength signal. Further, a data collection unit 502 collects the power detected by the spectrum detection unit 501. It should be understood that the spectrum detection unit 501 can detect a signal in a specific wavelength range. Therefore, no filter needs to be configured. An output amount of the spectrum detection unit 501 is still the power of each waveband. The spectrum detection unit may be specifically a component such as an optical spectrum analyzer (OSA) or an optical performance monitor (OPM). This is not limited herein.

203: Determine, based on the first optical power, a first optical power variation that is of each waveband of the first optical signal and that is used after the first optical signal is transmitted from a transmitting end to a receiving end, and determine, based on the second optical power, a second optical power variation that is of each waveband of the second optical signal and that is used after the second optical signal is transmitted from the transmitting end to the receiving end.

Transmission of an optical signal in an optical fiber may be affected by an SRS effect, and a power change may occur. Therefore, before the optical signal is coupled into the optical fiber, a power variation caused by the SRS effect in each waveband of the optical signal (including the first optical signal and the second optical signal) needs to be calculated in advance. It should be understood that the power variation of each waveband may also be referred to as a power transfer amount, a net power gain, or the like. A specific name of the power variation is not limited in this application.

Figure 6:
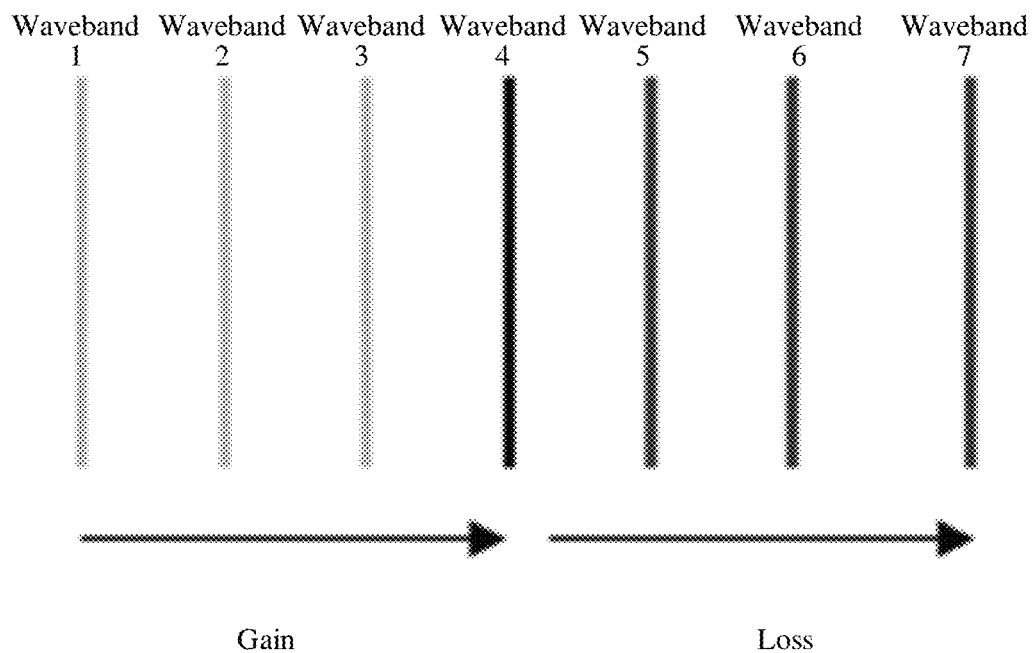
FIG. 6 is a schematic diagram of an embodiment of a power transfer between wavebands.

FIG. 6 is a schematic diagram of an embodiment of a power transfer between wavebands. As shown in FIG. 6, an optical signal is divided into seven wavebands in total, and a power transfer of waveband 4 is used as an example for description. Affected by the SRS effect, power of waveband 1 to waveband 3 is transferred to waveband 4, and power of waveband 4 is also transferred to waveband 5 to waveband 7. That is, waveband 1 to waveband 3 bring a power gain to waveband 4, and waveband 5 to waveband 7 bring a power loss to waveband 4. Therefore, power variations of waveband 4 relative to the other six wavebands need to be calculated separately, and then a total power variation of waveband 4 affected by the SRS effect may be obtained by summing up the variations.

This embodiment provides a specific calculation manner for calculating a power variation of a waveband, and detailed descriptions are provided below.

First, a first coefficient and a second coefficient need to be obtained. The first coefficient is a constant coefficient related to a transmission type of a signal. Specifically, the transmission type of the signal may include a fiber length, a fiber type, an optical amplifier type, and the like. It should be understood that, generally, after a network is constructed, parameters such as the fiber length, the fiber type, and the optical amplifier type may be determined, and these parameters may be stored in advance and updated regularly. In this case, a corresponding first coefficient may be queried based on a data table prestored in a local memory. The data table may be shown in Table 1.

TABLE 1

| Data table | Fiber length | 80 km | |
|---|---|---|---|
| | Fiber type | G.652 | G.654 |
| | Optical amplifier type | OA_x | OA_x |
| | First coefficient | A1 | A2 |

The second coefficient is associated with an optical power transfer between every two wavebands. Specifically, the second coefficient may be represented as Ti,j, meaning a power transfer coefficient of waveband i relative to waveband j. FIG. 6 is used as an example. T4,1 represents a power transfer coefficient of waveband 4 relative to waveband 1. Because waveband 1 brings a power gain to waveband 4, T4,1 is a positive value. T4,7 represents a power transfer coefficient of waveband 4 relative to waveband 7. Because waveband 7 brings a power loss to waveband 4, T4,7 is a negative value. It should be understood that the second coefficient may also be prestored in the local memory in a form of a data table, to facilitate query during calculation. The data table may be shown in Table 2.

TABLE 2

| | Second coefficient | | | | | | |
|---|---|---|---|---|---|---|---|
| No. | 1 | 2 | 3 | 4 | 5 | 6 | 7 |
| 1 | T1, 1 | T1, 2 | T1, 3 | T1, 4 | T1, 5 | T1, 6 | T1, 7 |
| 2 | T2, 1 | T2, 2 | T2, 3 | T2, 4 | T2, 5 | T2, 6 | T2, 7 |
| 3 | T3, 1 | T3, 2 | T3, 3 | T3, 4 | T3, 5 | T3, 6 | T3, 7 |
| 4 | T4, 1 | T4, 2 | T4, 3 | T4, 4 | T4, 5 | T4, 6 | T4, 7 |
| 5 | T5, 1 | T5, 2 | T5, 3 | T5, 4 | T5, 5 | T5, 6 | T5, 7 |
| 6 | T6, 1 | T6, 2 | T6, 3 | T6, 4 | T6, 5 | T6, 6 | T6, 7 |
| 7 | T7, 1 | T7, 2 | T7, 3 | T7, 4 | T7, 5 | T7, 6 | T7, 7 |

Further, the power variation of each waveband is calculated based on the optical power that is of each waveband in the optical signal (including the first optical signal and the second optical signal) and that is calculated in step 202, the first coefficient, and the second coefficient. Specifically, the power variation may be calculated according to the following formula. The formula is: $Si=A*\sum_{j=1}^{M}(Ti,j*Pi)$, where Si represents a total power variation of waveband i, A represents the first coefficient, M represents the quantity of wavebands, Ti,j represents the second coefficient, and Pi represents optical power of waveband i.

204: Determine a first compensation value based on the first optical power variation and the second optical power variation, and determine a second compensation value based on the first optical power variation and the second optical power variation.

Figure 7:
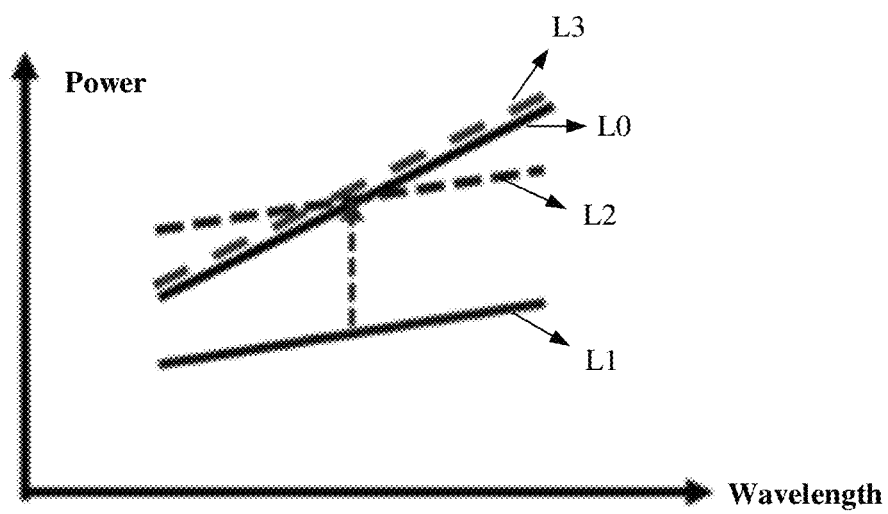
FIG. 7 is a schematic diagram of an embodiment of an optical signal power change.

In this embodiment, the first compensation value is used to compensate for total power of the first optical signal, and the second compensation value is used to compensate for a power spectral slope of the first optical signal. The following provides descriptions by using an example. FIG. 7 is a schematic diagram of an embodiment of an optical signal power change. As shown in FIG. 7, L0 represents a power spectrum of the second optical signal. L1 represents a power spectrum of the first optical signal. L2 represents a power spectrum obtained by performing power compensation on the first optical signal based on the first compensation value. It can be seen that, after compensation is performed based on the first compensation value, total power of the first optical signal matches total power of the second optical signal, but power spectral slopes of the first optical signal and the second optical signal do not match, to be specific, a power fluctuation in a middle waveband is small, and power fluctuations in wavebands on both sides are still large. Therefore, compensation needs to be further performed on L2 based on the second compensation value to obtain a power spectrum shown by L3, so that power spectral slopes of a compensated first optical signal and the second optical signal also match, and the power spectrum of the first optical signal may be corrected more precisely. It should be understood that if the first optical signal is a single-wavelength signal, the second compensation value may also be 0.

The following separately describes calculation manners of the first compensation value and the second compensation value.

The first compensation value may be calculated according to the following first formula, and detailed descriptions are provided below.

The first formula is: $C1=\sum_{i=1}^{M}((Si1-Si2)*Xi)$. C1 represents the first compensation value, i represents a sequence number of a waveband, M represents a quantity of wavebands, Si1 represents a power variation of waveband i in the second optical signal, Si2 represents a power variation of waveband i in the first optical signal, and Xi represents a percentage of optical power of waveband i in the first optical signal to the total power of the first optical signal. It should be understood that Si1 and Si2 may be obtained through calculation in step 203. Further, a difference between a power variation of each band before wavelength adding or dropping and a power variation of each waveband after wavelength adding or dropping is calculated, then multiplying is performed on the difference and a power weighted value of each band to obtain a result, and results of all bands are summed up to obtain the first compensation value.

The second compensation value may be calculated according to the following second formula, and detailed descriptions are provided below.

The second formula is: C2=(S1 max−S1 min)−(S2 max−S2 min). C2 represents the second compensation value, S1 max represents an optical power variation of a last-segment waveband in the first optical signal, S1 min represents an optical power variation of a first-segment waveband in the first optical signal, S2 max represents an optical power variation of a last-segment waveband in the second optical signal, and S2 min represents an optical power variation of a first-segment waveband in the second optical signal. It should be understood that (S1 max−S1 min) represents a power tilt amount of the first optical signal affected by the SRS effect, and (S2 max−S2 min) represents a power tilt amount of the second optical signal affected by the SRS effect. A difference between the two is a power tilt variation caused in a wavelength adding/dropping process.

It should be noted that the first-segment waveband in the first optical signal refers to a waveband with the smallest wavelength in the first optical signal, and the last-segment waveband in the first optical signal refers to a waveband with the largest wavelength in the first optical signal. The first-segment waveband in the second optical signal refers to a waveband with the smallest wavelength in the second optical signal, and the last-segment waveband in the second optical signal refers to a waveband with the largest wavelength in the second optical signal. For example, the second optical signal is distributed in waveband 1 to waveband 10, and the first-segment waveband and the last-segment waveband of the second optical signal are waveband 1 and waveband 10 respectively. After wavelength dropping is performed on the second optical signal, the first optical signal is distributed in waveband 2, waveband 5, and waveband 7, and the first-segment waveband and the last-segment waveband of the first optical signal are waveband 2 and waveband 7 respectively.

205: Compensate for the total power of the first optical signal based on the first compensation value, and compensate for the power spectral slope of the first optical signal based on the second compensation value.

Figure 8:
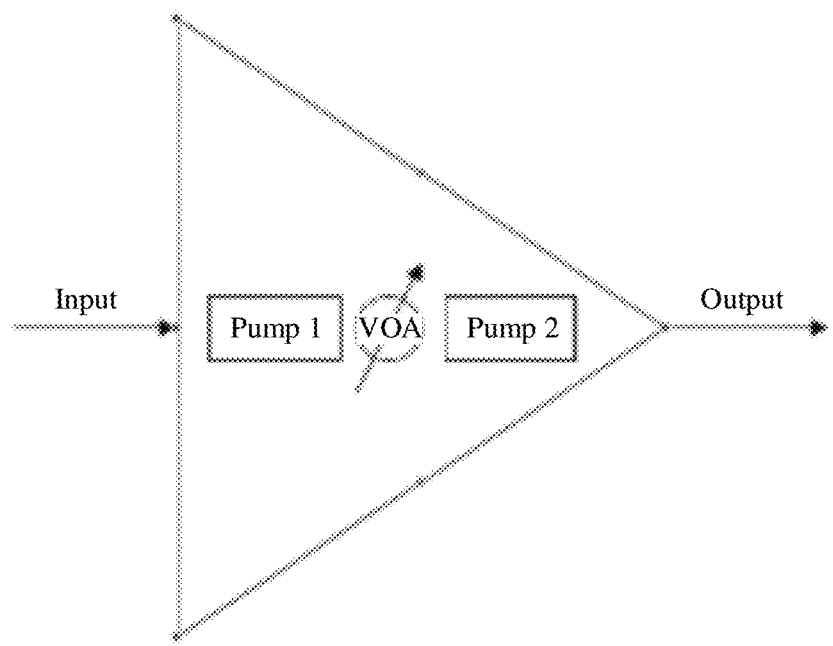
FIG. 8 is a schematic diagram of a structure of an optical amplifier according to an embodiment of this application.

FIG. 8 is a schematic diagram of a structure of an optical amplifier according to an embodiment of this application. Specifically, compensation for total power and a power spectrum slope may be performed by adjusting an optical amplifier. The following provides further descriptions with reference to FIG. 8.

In a first case, if the first compensation value is a positive value, currents of a pump 1 and a pump 2 inside the optical amplifier need to be increased, so that a gain that is of the first optical signal and that is used after the first optical signal passes through the optical amplifier increases by a value corresponding to the first compensation value. If the first compensation value is a negative value, currents of a pump 1 and a pump 2 inside the optical amplifier need to be decreased, so that a gain that is of the first optical signal and that is used after the first optical signal passes through the optical amplifier decreases by a value corresponding to the first compensation value. For example, if the total power of the first optical signal before power compensation is 18 dBm, and the first compensation value is 1 dB, total power of the first optical signal after power compensation is 19 dBm.

In a second case, if the second compensation value is a positive value, attenuation of a variable optical attenuator (VOA) between a pump 1 and a pump 2 needs to be increased, so that a gain slope that is of the first optical signal and that is used after the first optical signal passes through the optical amplifier increases by a value corresponding to the second compensation value. If the second compensation value is a negative value, attenuation of a VOA between a pump 1 and a pump 2 needs to be decreased, so that a gain slope that is of the first optical signal and that is used after the first optical signal passes through the optical amplifier decreases by a value corresponding to the second compensation value.

In embodiments of this application, the first optical signal is an optical signal obtained by performing wavelength adding or dropping on the second optical signal, and the signal transmitting end needs to detect the first optical power of each waveband in the first optical signal and the second optical power of each waveband in the second optical signal. Next, the first optical power variation caused by the SRS effect in each waveband after the first optical signal is transmitted from the transmitting end to the receiving end may be calculated based on the first optical power, and the second optical power variation caused by the SRS effect in each waveband after the second optical signal is transmitted from the transmitting end to the receiving end may be calculated based on the second optical power. Then, the first compensation value and the second compensation value may be determined based on the first optical power variation and the second optical power variation. Further, before the first optical signal is transmitted, the total power of the first optical signal may be compensated for based on the first compensation value, so that a power change caused by the SRS effect in a process of transmitting the first optical signal in the optical fiber does not exceed a system tolerance capability, thereby improving signal transmission stability. In addition, the power spectral slope of the first optical signal may further be compensated for based on the second compensation value, so that power spectrum slopes of the first optical signal and the second optical signal that are received by the signal receiving end match, thereby further improving the signal transmission stability.

The foregoing describes a method for determining a power compensation value of an optical signal in embodiments of this application, and the following describes a power calculation apparatus in embodiments of this application.

Figure 9:
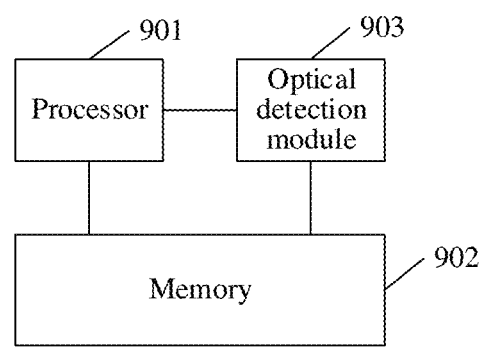
FIG. 9 is a schematic diagram of a structure of a power calculation apparatus.

FIG. 9 is a schematic diagram of a structure of a power calculation apparatus. The power calculation apparatus includes a processor 901, a memory 902, and an optical detection module 903. The processor 901, the memory 902, and the optical detection module 903 are connected to each other through a line. The memory 902 is configured to store program instructions and data. It should be noted that the power calculation apparatus may be a power calculation apparatus that implements the method for determining a power compensation value of an optical signal in the foregoing embodiment shown in FIG. 2.

In a possible implementation, the memory 902 stores program instructions and data that support the steps shown in FIG. 2 (for example, the first coefficient and the second coefficient described in step 203 above). The processor 901 and the optical detection module 903 are configured to perform the method steps shown in FIG. 2. Specifically, the optical detection module 903 is configured to perform step 201 and step 202 shown in FIG. 2. The processor 901 is configured to perform step 203 to step 205 shown in FIG. 2.

It should be understood that, as shown in FIG. 4, the optical detection module 903 may be divided into filters 401, PDs (402), and a data collection unit 403. Alternatively, the optical detection module 903 may be divided into a spectrum detection unit 501 and a data collection unit 502 as shown in FIG. 5.

Figure 10:
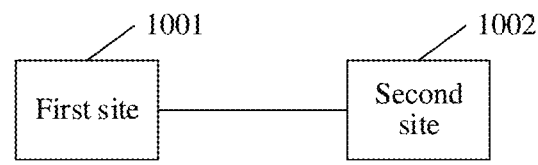
FIG. 10 is a schematic diagram of a structure of an optical transmission system according to an embodiment of this application.

FIG. 10 is a schematic diagram of a structure of an optical transmission system according to an embodiment of this application. The optical transmission system includes a first site 1001 and a second site 1002. An optical signal output by the first site 1001 is transmitted to the second site 1002 through an optical fiber. Specifically, the first site 1001 is configured to perform any method step in the embodiment shown in FIG. 2. Before the optical signal output by the first site 1001 is coupled into an optical fiber, a first compensation value and a second compensation value may be pre-calculated, and may be respectively used to compensate for a total power variation and a change amount of a power spectral slope of the optical signal. It should be understood that the first site may be an optical amplifier site, a ROADM site, or the like. This is not specifically limited herein.

A person of ordinary skill in the art may understand that all or some of the steps in the foregoing embodiments may be implemented by hardware or a program instructing related hardware. The program may be stored in a computer-readable storage medium. The storage medium may be a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether these functions are performed by hardware or software depends on particular applications and design constraints of the technical solutions. A person skilled in the art may use different methods to implement the described functions for each particular application, but it should not be considered that the implementation goes beyond the scope of this application.

When software is used to implement embodiments, all or some of the method steps in embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a power compensation value of an optical signal, comprising:
    obtaining a first optical signal and a second optical signal, wherein the first optical signal is an optical signal obtained by performing wavelength adding or dropping on the second optical signal, the second optical signal comprises at least one wavelength signal, the at least one wavelength signal of the second optical signal is distributed in at least one waveband, the first optical signal comprises at least one wavelength signal, and the at least one wavelength signal of the first optical signal is distributed in at least one waveband, wherein a wavelength signal of the first optical signal is distributed in any waveband corresponding to the first optical signal, and a wavelength signal of the second optical signal is distributed in any waveband corresponding to the second optical signal;
    detecting a first optical power of each waveband in the first optical signal and a second optical power of each waveband in the second optical signal;
    determining, based on the first optical power, a first optical power variation, that is related to each waveband corresponding to the first optical signal, and that is used after the first optical signal is transmitted from a transmitting end to a receiving end;
    determining, based on the second optical power, a second optical power variation, that is related to each waveband, corresponding to the second optical signal, and that is used after the second optical signal is transmitted from the transmitting end to the receiving end;
    determining a first compensation value based on the first optical power variation and the second optical power variation, wherein total power of the first optical signal is compensated for based on the first compensation value; and
    determining a second compensation value based on the first optical power variation and the second optical power variation, wherein a power spectral slope of the first optical signal is compensated for based on the second compensation value.

2. The method according to claim 1, wherein the method further comprises:
    obtaining a first coefficient and a second coefficient, wherein the first coefficient is associated with a transmission type of a signal, and the second coefficient is associated with an optical power transfer between every two wavebands;
    wherein the determining, based on the first optical power, a first optical power variation that is related to each waveband of the first optical signal and that is used after the first optical signal is transmitted from a transmitting end to a receiving end comprises:
        calculating the first optical power variation based on the first optical power, the first coefficient, and the second coefficient; and
    wherein the determining, based on the second optical power, a second optical power variation that is related to each waveband of the second optical signal and that is used after the second optical signal is transmitted from the transmitting end to the receiving end comprises:
        calculating the second optical power variation based on the second optical power, the first coefficient, and the second coefficient.

3. The method according to claim 2, wherein the method further comprises:
    obtaining a ratio of optical power of each waveband in the first optical signal to the total power of the first optical signal; and
    wherein the determining a first compensation value based on the first optical power variation and the second optical power variation comprises:
        substituting the first optical power variation, the second optical power variation, and the ratio into a first formula to calculate the first compensation value, wherein the first formula comprises:

$$C1=\Sigma_{i=1}^{M}((Si1-Si2)*Xi);$$

wherein C1 represents the first compensation value, i represents a sequence number of a waveband, M represents a quantity of wavebands, Si1 represents a second optical power variation of waveband i in the second optical signal, Si2 represents a first optical power variation of waveband i in the first optical signal, and Xi represents the ratio.

4. The method according to claim 1, wherein the determining the second compensation value based on the first optical power variation and the second optical power variation comprises:
    substituting a first optical power variation of a first-segment waveband in the first optical signal, a first optical power variation of a last-segment waveband in the first optical signal, a second optical power variation of a first-segment waveband in the second optical signal, and a second optical power variation of a last-segment waveband in the second optical signal into a second formula to calculate the second compensation value, wherein the second formula comprises:

$$C2=(S1\ max-S1\ min)-(S2\ max-S2\ min);$$

wherein C2 represents the second compensation value, S1 max represents the first optical power variation of the last-segment waveband in the first optical signal, S1 min represents the first optical power variation of the first-segment waveband in the first optical signal, S2 max represents the second optical power variation of the last-segment waveband in the second optical signal, and S2 min represents the second optical power variation of the first-segment waveband in the second optical signal.

5. The method according to claim 1, wherein the method further comprises:
compensating for the total power of the first optical signal based on the first compensation value; and
compensating for the power spectral slope of the first optical signal based on the second compensation value.

6. The method according to claim 5, wherein the compensating for the total power of the first optical signal based on the first compensation value comprises:
adjusting, by adjusting a pump current in an optical amplifier based on the first compensation value, output power of the first optical signal after the first optical signal passes through the optical amplifier.

7. The method according to claim 5, wherein the compensating for the power spectral slope of the first optical signal based on the second compensation value comprises:
adjusting, by adjusting, based on the second compensation value, attenuation of a variable optical attenuator (VOA) that is in an optical amplifier, a power spectral slope that is related to the first optical signal and that is used after the first optical signal passes through the optical amplifier.

8. The method according to claim 1, wherein the detecting first optical power of each waveband in the first optical signal comprises:
dividing the first optical signal into optical signals of a plurality of wavebands through filters; and
detecting the first optical power of each waveband in the first optical signal through a power detector; and
wherein the detecting the second optical power of each waveband in the second optical signal comprises:
dividing the second optical signal into optical signals of a plurality of wavebands through filters; and
detecting the second optical power of each waveband in the second optical signal through a power detector.

9. A power calculation apparatus, comprising:
a processor,
a memory, and
an optical detector, wherein the processor, the memory, and the optical detector are connected to each other through a line;
wherein the optical detector is configured to:
obtain a first optical signal and a second optical signal, wherein the first optical signal is an optical signal obtained by performing wavelength adding or dropping on the second optical signal, the second optical signal comprises at least one wavelength signal, the at least one wavelength signal of the second optical signal is distributed in at least one waveband, the first optical signal comprises at least one wavelength signal, the at least one wavelength signal of the first optical signal is distributed in at least one waveband, a wavelength signal of the first optical signal is distributed in any waveband corresponding to the first optical signal, and a wavelength signal of the second optical signal is distributed in any waveband corresponding to the second optical signal; and
detect first optical power of each waveband in the first optical signal and second optical power of each waveband in the second optical signal; and
wherein the processor is configured to:
determine, based on the first optical power, a first optical power variation that is related to each waveband corresponding to the first optical signal and that is used after the first optical signal is transmitted from a transmitting end to a receiving end;
determine, based on the second optical power, a second optical power variation that is related to each waveband corresponding to the second optical signal and that is used after the second optical signal is transmitted from the transmitting end to the receiving end;
determine a first compensation value based on the first optical power variation and the second optical power variation, wherein total power of the first optical signal is compensated for based on the first compensation value; and
determine a second compensation value based on the first optical power variation and the second optical power variation, wherein a power spectral slope of the first optical signal is compensated for based on the second compensation value.

10. The power calculation apparatus according to claim 9, wherein the processor is further configured to:
obtain a first coefficient and a second coefficient, wherein the first coefficient is associated with a transmission type of a signal, and the second coefficient is associated with an optical power transfer between every two wavebands; and
calculate the first optical power variation based on the first optical power, the first coefficient, and the second coefficient; and
calculate the second optical power variation based on the second optical power, the first coefficient, and the second coefficient.

11. The power calculation apparatus according to claim 10, wherein the processor is further configured to:
obtain a ratio of optical power of each waveband in the first optical signal to the total power of the first optical signal;
substitute the first optical power variation, the second optical power variation, and the ratio into a first formula to calculate the first compensation value, wherein the first formula comprises:

$$C1=\Sigma_{i=1}^{M}((Si1-Si2)*Xi);$$

wherein C1 represents the first compensation value, i represents a sequence number of a waveband, M represents a quantity of wavebands, Si1 represents a second optical power variation of waveband i in the second optical signal, Si2 represents a first optical power variation of waveband i in the first optical signal, and Xi represents the ratio.

12. The power calculation apparatus according to claim 9, wherein the processor is configured to:

substitute a first optical power variation of a first-segment waveband in the first optical signal, a first optical power variation of a last-segment waveband in the first optical signal, a second optical power variation of a first-segment waveband in the second optical signal, and a second optical power variation of a last-segment waveband in the second optical signal into a second formula to calculate the second compensation value, wherein the second formula comprises:

$$C2=(S1\ max-S1\ min)-(S2\ max-S2\ min);$$

wherein C2 represents the second compensation value, S1 max represents the first optical power variation of the last-segment waveband in the first optical signal, S1 min represents the first optical power variation of the first-segment waveband in the first optical signal, S2 max represents the second optical power variation of the last-segment waveband in the second optical signal, and S2 min represents the second optical power variation of the first-segment waveband in the second optical signal.

13. The power calculation apparatus according to claim 9, wherein the processor is further configured to:
compensate for the total power of the first optical signal based on the first compensation value; and
compensate for the power spectral slope of the first optical signal based on the second compensation value.

14. The power calculation apparatus according to claim 13, wherein the processor is configured to:
adjust, by adjusting a pump current in an optical amplifier based on the first compensation value, output power of the first optical signal after the first optical signal passes through the optical amplifier.

15. The power calculation apparatus according to claim 13, wherein the processor is configured to:
adjust, by adjusting, based on the second compensation value, attenuation of a variable optical attenuator (VOA) that is in an optical amplifier, a power spectral slope that is related to the first optical signal and that is used after the first optical signal passes through the optical amplifier.

16. The power calculation apparatus according to claim 9, wherein the optical detector comprises filters and power detectors, wherein the filters are configured to:
divide the first optical signal into optical signals of a plurality of wavebands; and
divide the second optical signal into optical signals of a plurality of wavebands; and
wherein the power detector is configured to:
detect the first optical power of each waveband in the first optical signal; and
detect the second optical power of each waveband in the second optical signal.

17. An optical transmission system, comprising:
a first site, wherein the first site is configured to perform a method comprising:
obtaining a first optical signal and a second optical signal, wherein the first optical signal is an optical signal obtained by performing wavelength adding or dropping on the second optical signal, the second optical signal comprises at least one wavelength signal, the at least one wavelength signal of the second optical signal is distributed in at least one waveband, the first optical signal comprises at least one wavelength signal, and the at least one wavelength signal of the first optical signal is distributed in at least one waveband, wherein a wavelength signal of the first optical signal is distributed in any waveband corresponding to the first optical signal, and a wavelength signal of the second optical signal is distributed in any waveband corresponding to the second optical signal;
detecting first optical power of each waveband in the first optical signal and second optical power of each waveband in the second optical signal;
determining, based on the first optical power, a first optical power variation that is related to each waveband corresponding to the first optical signal and that is used after the first optical signal is transmitted from a transmitting end to a receiving end;
determining, based on the second optical power, a second optical power variation that is related to each waveband corresponding to the second optical signal and that is used after the second optical signal is transmitted from the transmitting end to the receiving end;
determining a first compensation value based on the first optical power variation and the second optical power variation, wherein total power of the first optical signal is compensated for based on the first compensation value; and
determining a second compensation value based on the first optical power variation and the second optical power variation, wherein a power spectral slope of the first optical signal is compensated for based on the second compensation value; and
a second site, wherein the second site is configured to receive an optical signal output by the first site.

18. The optical transmission system according to claim 17, wherein the method further comprises:
obtaining a first coefficient and a second coefficient, wherein the first coefficient is associated with a transmission type of a signal, and the second coefficient is associated with an optical power transfer between every two wavebands;
wherein the determining, based on the first optical power, a first optical power variation that is related to each waveband of the first optical signal and that is used after the first optical signal is transmitted from a transmitting end to a receiving end comprises:
calculating the first optical power variation based on the first optical power, the first coefficient, and the second coefficient; and
wherein the determining, based on the second optical power, a second optical power variation that is related to each waveband of the second optical signal and that is used after the second optical signal is transmitted from the transmitting end to the receiving end comprises:
calculating the second optical power variation based on the second optical power, the first coefficient, and the second coefficient.

19. The optical transmission system according to claim 18, wherein the method further comprises:
obtaining a ratio of optical power of each waveband in the first optical signal to the total power of the first optical signal; and
wherein the determining a first compensation value based on the first optical power variation and the second optical power variation comprises:
substituting the first optical power variation, the second optical power variation, and the ratio into a first formula to calculate the first compensation value, wherein the first formula comprises:

$$C1 = \Sigma_{i=1}^{M}((Si1-Si2)*Xi);$$

wherein C1 represents the first compensation value, i represents a sequence number of a waveband, M represents a quantity of wavebands, Si1 represents a second optical power variation of waveband i in the second optical signal, Si2 represents a first optical power variation of waveband i in the first optical signal, and Xi represents the ratio.

20. The optical transmission system according to claim 17, wherein the first site comprises an optical amplifier site or a reconfigurable optical add/drop multiplexer (ROADM) site.

\* \* \* \* \*